United States Patent
Abe et al.

(10) Patent No.: US 7,898,699 B2
(45) Date of Patent: Mar. 1, 2011

(54) ELECTRONIC ENDOSCOPE APPARATUS

(75) Inventors: Kazunori Abe, Saitama (JP); Yoshifumi Donomae, Kawasaki (JP)

(73) Assignee: Fujifilm Corporation, Tokyo (JP)

( * ) Notice: Subject to any disclaimer, the term of this patent is extended or adjusted under 35 U.S.C. 154(b) by 1484 days.

(21) Appl. No.: 11/253,623

(22) Filed: Oct. 20, 2005

(65) Prior Publication Data
US 2006/0082666 A1 Apr. 20, 2006

(30) Foreign Application Priority Data
Oct. 20, 2004 (JP) .............................. 2004-305038

(51) Int. Cl.
H04N 1/04 (2006.01)
(52) U.S. Cl. ...................... 358/474; 358/471; 358/518; 358/514; 382/167; 382/128; 600/101; 600/160; 348/279; 348/275
(58) Field of Classification Search ................ 358/474, 358/505, 488, 486, 471, 518, 514, 515; 382/167, 382/128, 254, 274, 275; 600/101, 160, 476, 600/310, 477, 142; 348/231.99, 275, 279, 348/302, 272, 69, 65, E9.054, 362
See application file for complete search history.

(56) References Cited

U.S. PATENT DOCUMENTS

| | | | |
|---|---|---|---|
| 4,716,457 A | | 12/1987 | Matsuo |
| 4,962,540 A | * | 10/1990 | Tsujiuchi et al. ............. 382/165 |
| 5,105,466 A | * | 4/1992 | Tsujiuchi et al. ............. 382/162 |
| 5,358,834 A | * | 10/1994 | Jennings et al. ............. 430/535 |
| 5,604,530 A | * | 2/1997 | Saito et al. ..................... 348/70 |
| 5,627,583 A | | 5/1997 | Nakamura et al. |
| 5,867,284 A | * | 2/1999 | Heinrichs et al. ........... 358/516 |
| 6,772,003 B2 | * | 8/2004 | Kaneko et al. .............. 600/476 |
| 6,905,462 B1 | * | 6/2005 | Homma et al. .............. 600/176 |
| 6,943,822 B2 | * | 9/2005 | Iida et al. ...................... 348/65 |
| 7,313,272 B2 | * | 12/2007 | Miyanohara et al. ........ 382/166 |

(Continued)

FOREIGN PATENT DOCUMENTS

EP 0 669 756 A1 2/1995

(Continued)

OTHER PUBLICATIONS

Japanese Office Action for Japanese Patent Application No. 2004-305038, Mar. 23, 2010.

(Continued)

*Primary Examiner*—Negussie Worku
(74) *Attorney, Agent, or Firm*—Sughrue Mion, PLLC (57) ABSTRACT

An electronic endoscope apparatus includes a scope unit in which a color filter is provided. The scope unit further includes a filter information storage means for storing filter information showing the kind of the color filter provided in the scope unit. Further, a plurality of kinds of scope units, each of which has filter information showing a different kind of color filter from each other, can be selectively connected. The filter information stored in the filter storage means of the connected scope unit is obtained. Then, color space correction processing is performed, based on the filter information, on color image signals output from the plurality of kinds of scope units so that each of signals for display, produced from the color image signals, represents the same point in color space.

8 Claims, 4 Drawing Sheets

U.S. PATENT DOCUMENTS

| | | | |
|---|---|---|---|
| 7,476,106 B1 * | 1/2009 | Wu et al. | 439/67 |
| 7,627,189 B2 * | 12/2009 | Donomae et al. | 382/254 |
| 7,671,888 B2 * | 3/2010 | Nogami et al. | 348/45 |
| 2003/0001952 A1 * | 1/2003 | Iida et al. | 348/69 |
| 2005/0028226 A1 * | 2/2005 | Erfle et al. | 800/8 |

FOREIGN PATENT DOCUMENTS

| | | |
|---|---|---|
| JP | 61-179129 A | 8/1986 |
| JP | 04-338445 | 11/1992 |
| JP | 08-111812 | 4/1996 |
| JP | 2003-070735 | 3/2003 |

OTHER PUBLICATIONS

Extended European Search Report corresponding to Application No. 05022920.2-1241, dated Sep. 1, 2010.

* cited by examiner

ELECTRONIC ENDOSCOPE APPARATUS

BACKGROUND OF THE INVENTION

1. Field of the Invention

The present invention relates to an electronic endoscope apparatus for obtaining a color image signal by obtaining an image of an object to be observed by a scope unit which includes an imaging element for obtaining the image of the object to be observed by receiving light transmitted through a color filter.

2. Description of the Related Art

Conventionally, various kinds of electronic endoscope apparatuses for displaying color images based on color image signals have been proposed. In the electronic endoscope apparatuses, the color image signal is obtained by obtaining an image of an object to be observed by a scope unit which includes an imaging element on which a color filter is provided.

As an example of the electronic endoscope apparatus as described above, an electronic endoscope apparatus which obtains a color image signal including an R component, G component and B component, for example, using a single CCD (imaging element) has been proposed. The electronic endoscope apparatus is a so-called single-chip electronic endoscope apparatus.

In the single-chip electronic endoscope apparatus as described above, a color filter such as a primary color filter and a complementary color filter is used. The primary color filter includes a filter of an R component, a filter of a G component and a filter of a B component. The complementary color filter includes a filter of a Cy component, a filter of a Ye component, a filter of an Mg component and a filter of a G component.

When a color image is displayed on a monitor or the like based on a color image signal obtained by a CCD (charge coupled device) on which the color filter as described above is provided, video signal conversion processing is performed on the color image signal. However, the method for performing the video signal conversion processing is different according to the kind of the color filter. For example, if a color image signal including R, G and B components is obtained by a CCD on which a primary color filter is provided, a luminance signal Y and chrominance signals R-Y and B-Y are calculated using the color image signal including the R, G and B components without processing. The luminance signal Y and the chrominance signals R-Y and B-Y are used as video signals.

Further, generally, if a color image signal is obtained by a CCD on which, for example, a complementary color filter including Cy, Mg, Ye and G components is provided, the color image signal of these components is used to calculate a luminance signal Y and chrominance signals Cr and Cb. Further, the luminance signal Y and the chrominance signals Cr and Cb are used to calculate R, G and B signals. The calculated R, G and B signals are used to calculate a luminance signal Y and chrominance signals R-Y and B-Y. These signals are used as video signals.

Here, when a color image signal is obtained by a CCD on which a complementary color filter is provided, there is a well-known technique in readout of signals. In this technique, when the signals are read out, two adjacent pixels are mixed with each other.

However, when R, G and B components are calculated based on signal components obtained by mixing pixels as described above, the R, G and B components are not calculated based on pixel information but a mixed signal. Therefore, the R, G and B components of the adjacent pixels are mixed. Further, when the video signal is calculated as described above, the video signal is calculated within a limited range according to the hardware configuration of an endoscope apparatus. In other words, the video signal is calculated using limited numerical values. Therefore, the numerical values are rounded to an integer. Hence, a color which is reproduced from a video signal based on a color image signal obtained by a CCD on which a primary color filter is provided and a color which is reproduced from a video signal based on a color image signal obtained by a CCD on which a complementary color filter is provided are different from each other.

Therefore, even if the same color is photographed, a color which represents a different point in color space is reproduced, for example, according to a difference in the filter.

Therefore, when an image is displayed using color space that can represent each of RGB colors in 256 values, if each scope unit that has a different kind of color filter, as described above, is connected and used, the color of the displayed image is different according to the scope unit which is used.

The color image which is displayed by the electronic endoscope apparatus is provided to perform image diagnoses for observing the color of a mucous membrane, the color of a dyed mucous membrane, or the like. However, if a color representing a different point in color space is reproduced according to the kind of a color filter provided on the CCD, it is difficult to always perform accurate image diagnoses.

A technique for adjusting white balance based on the sensitivity of a CCD provided in the scope unit is disclosed in Japanese Unexamined Patent Publication No. 61 (1986)-179129. However, a difference in the kind of the color filter is not considered in the technique.

SUMMARY OF THE INVENTION

In view of the foregoing circumstances, it is an object of the present invention to provide an electronic endoscope apparatus which includes a scope unit in which a color filter as described above is provided, and which can produce a signal for displaying a color image so that when the same color is photographed, a color represented by the same point in color space is always displayed regardless of a difference in the kind of the color filter as described above.

An electronic endoscope apparatus according to the present invention is an electronic endoscope apparatus comprising:

a scope unit including a color filter which transmits light reflected by an object to be observed when the object is illuminated with light and an imaging element for obtaining an image of the object to be observed by receiving the reflected light transmitted through the color filter, which outputs a color image signal by obtaining the image of the object to be observed by the imaging element; and a signal processing unit for producing a signal for display, which can display an image including predetermined color components by performing signal processing, based on the kind of the color filter, on the color image signal output from the imaging element of the scope unit, wherein the scope unit further includes a filter information storage means for storing filter information showing the kind of the color filter provided in the scope unit, and wherein the signal processing unit includes a connection unit for selectively connecting a plurality of kinds of scope units, each of which has the filter information showing a different kind of color filter from each other, a filter information obtainment means for obtaining the filter information stored in the filter information storage means of the scope unit connected to the connection unit, and a color space correction processing unit for performing color space correction processing, based on the filter information obtained by the filter information obtainment means, on the color image signal so that each of the signals for display, produced from each of the color image signals which are output from the plurality of kinds of scope units represents the same point in color space.

The electronic endoscope apparatus as described above may be configured so that the color space correction processing unit does not perform the color space correction processing on the color image signal if the kind of the color filter in the filter information is a primary color filter and the color space correction processing unit performs the color space correction processing on the color image signal if the kind of the color filter in the filter information is a complementary color filter Further, the scope unit may further include an image formation optical system for forming the image of the object to be observed on the imaging element and an optical system information storage means for storing optical system information showing the kind of the image formation optical system. Further, the signal processing unit may further include an optical system information obtainment means for obtaining the optical system information stored in the optical system information storage means of the scope unit connected to the connection unit and a luminance correction processing unit for performing luminance correction processing on the color image signal based on the optical system information obtained by the optical system information obtainment means.

Further, the scope unit may further include an image formation optical system for forming the image of the object to be observed on the imaging element and a mask information storage means for storing mask information showing a relationship between the size of an imaging plane of the imaging element provided in the scope unit and the size of an image formed on the imaging plane by the image formation optical system. Further, the signal processing unit may further include a mask information obtainment means for obtaining the mask information stored in the mask information storage means of the scope unit connected to the connection unit and a mask processing unit for performing mask processing on the color image signal based on the mask information obtained by the mask information obtainment means.

Here, the "filter information" includes information which indirectly shows the kind of a color filter as well as information which directly shows the kind of the color filter.

Further, the expression "so that each of the signals for display, produced from each of the color image signals which are output from the plurality of kinds or scope units, represents the same point in color space" means that it is not necessary that each of the signals for display represents exactly the same point in the color space. Each of the signals for display may represent approximately the same point in the color space.

The phrase "optical system information" includes information which indirectly shows the kind of an image formation optical system as well as information which directly shows the kind of the image formation optical system.

Further, the "mask information" includes information which indirectly shows a relationship between the size of an imaging plane of an imaging element and that of an image formed on the imaging plane by the image formation optical system as well as information which directly shows the relationship.

Further, the "mask processing" is processing for masking or covering the peripheral portion of the display image of the object to be observed. The peripheral portion of the display image is masked, for example, by converting the color image signal corresponding to the peripheral portion of the image formed on the imaging plane of the imaging element into a signal representing black, or the like.

Further, the "mask information" indirectly shows an area on which the "mask processing" is performed.

According to the electronic endoscope according to the present invention, the scope unit includes a filter information storage means for storing filter information showing the kind of a color filter provided in the scope unit. Further, the signal processing unit obtains the filter information stored in the filter information storage means. Then, color space correction processing is performed based on the obtained filter information. Therefore, when the same color is photographed, a color image can be displayed so that a color represented by the same point in color space is always displayed regardless of a difference in the kind of the scope unit, namely a difference in the kind of the color filter.

Further, generally, when an image of an object to be observed is formed on an imaging plane of an imaging element by an image formation optical system, as the angle of view of the image formation optical system is wider, the peripheral portion of the image becomes darker. Therefore, in the electronic endoscope apparatus, an optical system information storage means for storing optical system information showing the kind of the image formation optical system is provided in the scope unit. Further, the signal processing unit obtains the optical system information and performs luminance correction processing on the color image signal based on the obtained optical system information. If the luminance correction processing is performed so that the peripheral portion of the display image of the object to be observed becomes lighter as the angle of view is wider, an image which has the same distribution of luminance can be always displayed regardless of the kind of the scope unit, namely the kind of the image formation optical system.

Further, when mask processing as described above is performed in the electronic endoscope apparatus, the area of the image, on which the mask processing is performed, is different according to a relationship between the size of the imaging plane of the imaging element and that of an image formed on the imaging plane by the image formation optical system. Therefore, in the electronic endoscope apparatus as described above, a mask information storage means for storing mask information showing the relationship between the size of the imaging plane of the imaging element and that of the image formed on the imaging plane by the image formation optical system is provided in the scope unit. Further, the image processing unit obtains the mask information and performs mask processing on the color image signal based on the obtained mask information. Accordingly, the mask processing can be always performed in an appropriate area of the image regardless of the kind of the scope unit, namely the mask information as described above.

DESCRIPTION OF THE PREFERRED EMBODIMENTS

Figure 1:
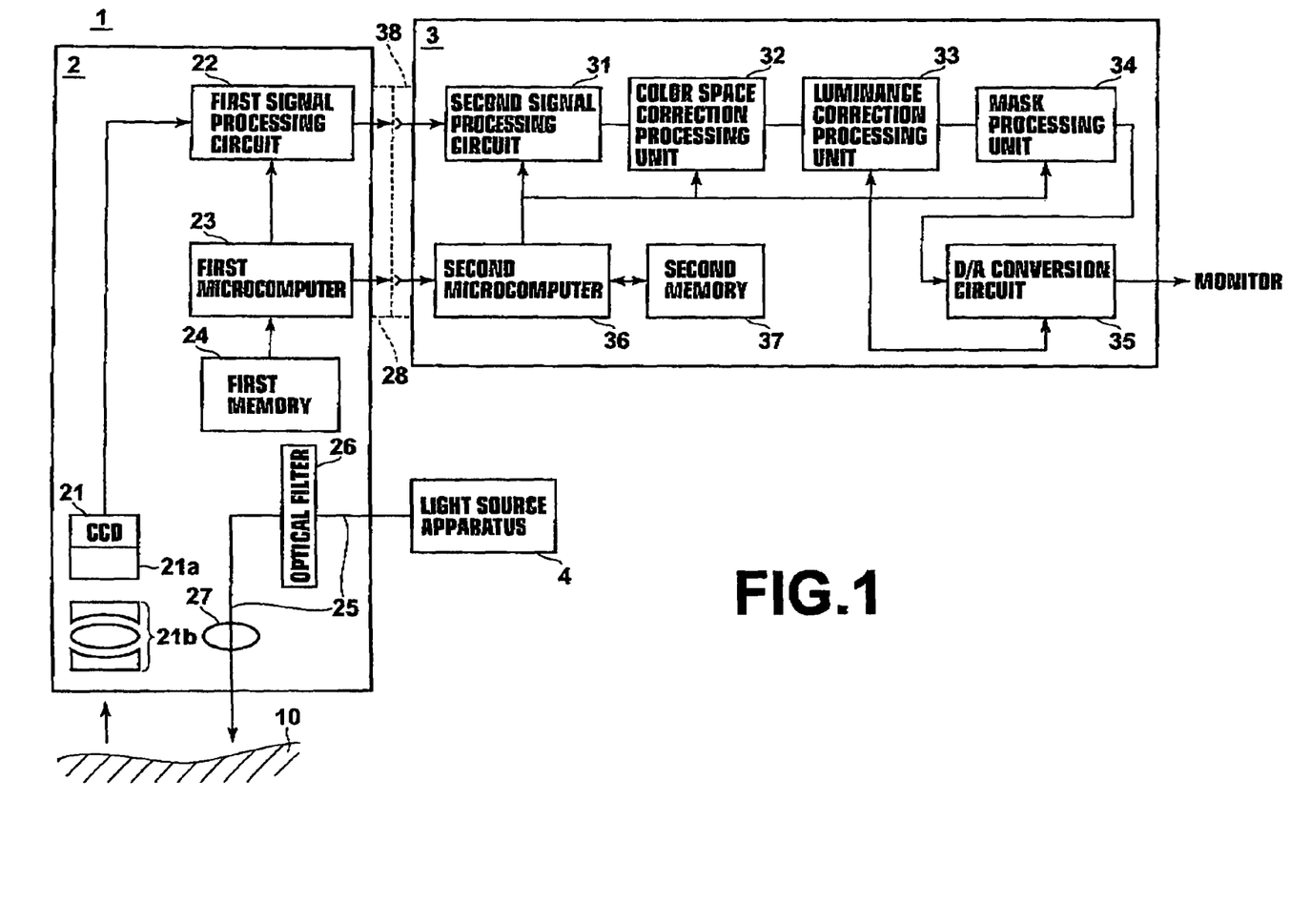
FIG. 1 is a block diagram illustrating the schematic configuration of an electronic endoscope apparatus according to an embodiment of the present invention.

Hereinafter, an embodiment of the present invention will be described with reference drawings. FIG. 1 is a block diagram illustrating the schematic configuration of an electronic endoscope apparatus according to the present invention.

As illustrated in FIG. 1, an electronic endoscope apparatus 1 according to the present invention includes a scope unit 2 for obtaining an image of an object 10 to be observed, such as living tissue in a body cavity. The scope unit 2 can be inserted into the body cavity or the like. The electronic endoscope apparatus 1 also includes a signal processing unit 3 for producing a digital video signal for displaying an image on a monitor by performing predetermined signal processing on a signal obtained by the scope unit 2. The electronic endoscope apparatus 1 also includes a light source apparatus 4 for outputting white light for illuminating the object 10 to be observed to the scope unit 2.

As illustrated in FIG. 1, the scope unit 2 includes a CCD 21 for obtaining an image of the object 10 to be observed. The scope unit 2 also includes a first signal processing circuit 22 for performing predetermined processing on a signal obtained by the CCD 21 and a first microcomputer 23 for performing various kinds of control processing. The scope unit 2 also includes a first memory 24 for storing scope machine type information about the scope unit 2. The scope unit 2 also includes a light guide means 25 for guiding the white light output from the light source apparatus 4 to the leading edge of the scope unit 2. The scope unit 2 also includes an optical filter 26 for obtaining illumination light in a desired wavelength range by removing light in the other range from the white light output from the light source apparatus 4. The scope unit 2 also includes an illumination lens 27 for illuminating the object 10 to be observed with the illumination light L which is guided by the light guide means 25. Further, an objective optical system 21b for forming an image of the object 10 to be observed on the CCD 21 is provided at the leading edge of the scope unit 2. The objective optical system 21b includes two concave lenses and a single convex lens, as illustrated in FIG. 1. Further, the scope unit 2 includes a connector unit 28 for connecting to a signal processing unit 3.

The CCD 21 is attached to the leading edge of the scope unit 2. The CCD 21 obtains an image of the object 10 to be observed by performing photoelectric conversion on light reflected at the object 10 to be observed when the object is illuminated with light. Further, a color filter 21a is provided on the CCD 21. The CCD 21 outputs a color image signal by performing photoelectric conversion on the light transmitted through the color filter 21a. The color filter 21a may be a primary color filter, complementary color filter, or the like.

The primary color filter includes three color components, namely an R (red) component, G (green) component and B (blue) component. The complementary color filter includes four color components, namely a Cy (cyan) component, Mg (magenta) component, Ye (yellow) component and G (green) component. One of these kinds of color filters is provided on the CCD 21. In this embodiment, the CCD 21 and the color filter 21a are integrated. However, the CCD 21 and the color filter 21a may be provided separately.

The first signal processing circuit 22 performs signal processing such as correlated double sampling processing and automatic gain control and A/D conversion processing on the signal output from the CCD 21. The operation of the first signal processing circuit is controlled by the first microcomputer 23.

The first memory 24 stores the scope machine type information about the scope unit 2. The scope machine type information may be any kind of information as far as the information indirectly shows the kind of a color filter 21a provided on the CCD 21. The name of the machine type of the scope, ID information, or the like may be used as the scope machine type information. In the present embodiment, it is assumed that the name of the machine type, such as scope A, scope B, or scope C, is stored in the first memory 24. The scope machine type information is read out by the first microcomputer 23 and output to a second microcomputer 36 in the signal processing unit 3.

As the optical filter 26, an optical filter for removing light in a wavelength range of red, an optical filter for removing light in a wavelength range of yellow, or the like is used based on the kind of the object to be observed.

The signal processing unit 3 includes a second signal processing circuit 31 for producing a digital video signal based on the signal output from the first signal processing circuit 22 of the scope unit 2. The signal processing unit 2 includes a color space correction processing unit 32 for performing color space correction processing on the digital video signal output from the second signal processing circuit 31. The signal processing unit 3 also includes a luminance correction processing unit 33 for performing luminance correction processing and a mask processing unit 34 for performing mask processing. The signal processing unit 3 also includes a D/A conversion circuit 35 for performing D/A conversion and a second microcomputer 36 for controlling various kinds of signal processing as described above. The signal processing unit 3 also includes a second memory 37 for storing a correspondence table of a plurality of kinds of scope machine type information, filter information, optical system information and mask information. Further, a connector unit 38 for connecting the scope unit 2 to the signal processing unit 3 is provided in the image processing unit 3. The connector unit 38 is structured so that a plurality of kinds of scope units 2 is attached to or detached from the connector unit 38. A scope unit 2 is selected from the plurality of kinds of scope units 2, and the selected scope unit 2 is connected to the connector unit 38 of the image processing unit 3.

The second memory 37 stores a correspondence table of a plurality of kinds of scope machine type information, filter information, optical system information and mask information, for example, as illustrated below.

Figure 2:
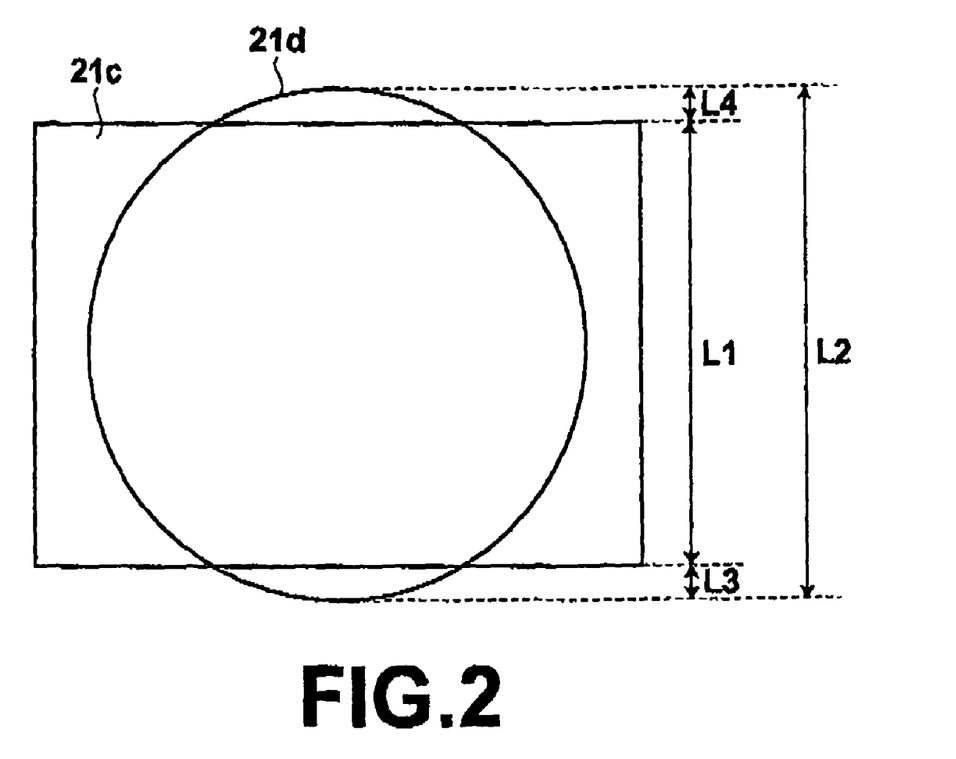
FIG. 2 is a diagram for explaining mask information.

Here, the optical system information in the present embodiment is information showing the angle of view of the objective optical system 21b of the scope unit 2. Further, the mask information in the present embodiment is information showing a relationship between the size of an imaging plane 21c of the CCD 21 in the scope unit 2 and that of an image 21d formed on the imaging plane 21c of the CCD 21 by the objective optical system 21b. For example, a ratio of the diameter L2 of the image 21d formed on the imaging plane 21c of the CCD 21 with respect to the length L1 of the shorter side of the imaging plane 21c of the CCD 21 may be used as the information (please refer to FIG. 2). In table 1, the value of 130% in the mask information indicates, for example, that the ratio of L4 with respect to L1 in FIG. 2 and the ratio of L3 with respect to L1 in FIG. 2 are 15%, respectively. Meanwhile, the value of 90% in the mask information indicates that the size of the image 21d formed on the imaging plane 21c is smaller than that of the imaging plane 21c of the CCD 21.

TABLE 1

| Scope Machine Type Information | Filter Information | Optical System Information | Mask Information |
|---|---|---|---|
| Scope A | Primary Color | 140 degrees | 130% |
| Scope B | Complementary Color | 120 degrees | 110% |
| Scope C | Primary Color | 90 degrees | 90% |

The second microcomputer 36 receives the scope machine type information from the first microcomputer 23 of the scope unit 2, and refers to the above table based on the scope machine type information received from the first microcomputer 23. Accordingly, the second microcomputer 36 obtains filter information, optical system information and mask information corresponding to the scope machine type information. Then, the second microcomputer 36 outputs various kinds of control signals, based on the content of the obtained filter information, optical system information and mask information, to the second signal processing circuit 31, space correction processing unit 32, luminance correction processing unit 33 and the mask processing unit 34.

It the signal output from the first signal processing circuit 22 of the scope unit 2 is a signal of R, G and B, in other words, if the color filter 21a provided on the CCD 21 is a primary color filter, the second signal processing circuit 31 uses the signal of R, G and B to produce a luminance signal Y and chrominance signals R-Y and B-Y. Then, the luminance signal Y and the chrominance signals R-Y and B-Y are output to the color space correction processing unit 32. If the signal output from the first signal processing circuit 22 of the scope unit 2 is a signal of Cy, Mg, Ye and G, in other words, if the color filter 21a provided on the CCD 21 is a complementary color filter, the signal of Cy, Mg, Ye and G is converted into a luminance signal Y and chrominance signal Cr and Cb. Then, a signal of R, G and B is further calculated from the luminance signal Y and the chrominance signals Cr and Cb, and the calculated signal of R, G and B is output to the color space correction processing unit 32.

If the color filter 21a provided on the CCD 21 of the scope unit 2 is a primary color filter, the second microcomputer 36 outputs a control signal to the second signal processing circuit 31 so that the second signal processing circuit 31 produces and outputs the luminance signal Y and the chrominance signals R-Y and B-Y, as described above. If the color filter 21a provided on the CCD 21 of the scope unit 2 is a complementary color filter, the second microcomputer 36 outputs a control signal to the second signal processing circuit 31 so that the second signal processing circuit 31 produces and outputs the signal of R, G and B, as described above.

The color space correction processing unit 32 performs processing on the signal output from the scope unit 2 so that a difference between the point in color space, represented by the signal output from the scope unit 2 in which a primary color filter is provided as the color filter 21a, and the point in color space, represented by the signal output from the scope unit 2 in which a complementary color filter is provided as the color filter 21a, becomes small. If the color space correction processing as described above is performed, when an image of the same color is photographed, a signal representing an equivalent point in color space can be always obtained regardless of a difference in the machine type of the scope unit 2 connected to the signal processing unit 3. Specifically, if the signal output from the scope unit 2 is a signal obtained by a CCD 21 on which a primary color filter is provided, in other words, if the signal is a signal of R, G and B, the color space correction processing unit 32 does not perform any processing. The luminance signal Y and the chrominance signals R-Y and B-Y which are output from the second signal processing unit 22 are output to the luminance correction processing unit 33 without processing.

Figure 3:
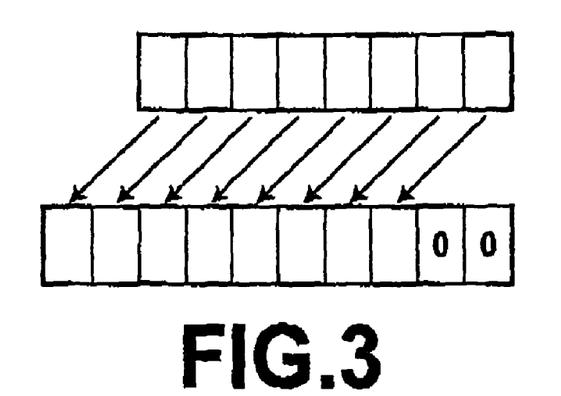
FIG. 3 is a diagram for explaining color space correction processing in the electronic endoscope apparatus illustrated in FIG. 1.

Meanwhile, if the signal output from the scope unit 2 is a signal obtained by a CCD 21 on which a complementary color filter is provided, in other words, if the signal is a signal of Cy, Mg, Ye and G, the color space correction processing unit 32 performs color space correction processing on the signal of R, G and B output from the first signal processing circuit 22. In the color space correction processing, if the signal of R, G and B output from the first signal processing circuit 22 is represented, for example, by eight bits, the signal represented by eight bits is shifted by two bits in the direction of higher digits, as illustrated in FIG. 3. Accordingly, the signal of R, G and B of eight bits is converted into a signal of R, G and B of ten bits. Then, a signal of R, G and B of eight bits corresponding to the signal of R, G and B of ten bits is calculated, and a luminance signal Y and chrominance signals R-Y and B-Y are calculated by using the calculated signal of R, G and B of eight bits. Then, the luminance signal Y and the chrominance signals R-Y and B-Y are output to the luminance correction processing unit 33.

As a method for calculating the signal of R, G and B of eight bits corresponding to the signal of R, G and B of ten bits, the value of a signal of R, G and B of eight bits corresponding to the value of a signal of R, G and B of ten bits, as described above, may be stored in a table in advance, for example. Then, the value of the signal of R, G and B of eight bits may be obtained by referring to the table. Alternatively, a function which has been obtained in advance may be set, and the value of the signal of R, G and B of eight bits corresponding to the signal of R, G and B of ten bits may be obtained by using the function.

Figure 4:
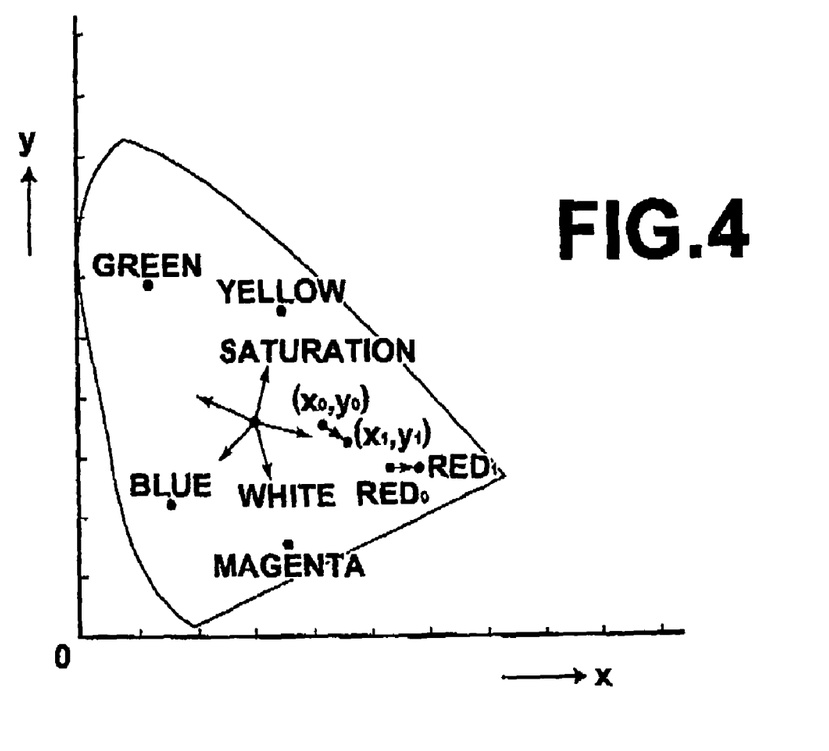
FIG. 4 is a diagram for explaining the effect of color space correction processing.

Here, color space in a CIE color chart is illustrated in FIG. 4. If attention is paid to a point (for example, a point representing red) in the color space, the signal output from the scope unit 2 in which the complementary color filter is provided represented by the point of $Red_0$ and the signal output from the scope unit 2 in which the primary color filter is provided is represented by the point of $Red_1$. Therefore, there is a difference in the position (coordinate point) of the color in the color space. Hence, in the present invention, color space correction processing is performed so that the coordinate point of red ($Red_0$) in the color space, which is obtained using the complementary color filter, is moved to the coordinate point of red ($Red_1$) in the color space, which is obtained using the primary color filter. In other words, the color space correction processing is performed so that the coordinate point ($X_0$, $Y_0$) in the color space, which is obtained using the complementary color filter, becomes the same as the coordinate point ($X_1$, $Y_1$) in the color space, which is obtained using the complementary color filter.

If the color filter 21a provided on the CCD 21 of the scope unit 2 is a primary color filter, the second microcomputer 36 outputs a control signal to the color space processing unit 32 so that the color space processing unit 32 outputs the luminance signal Y and the chrominance signals R-Y and B-Y, which are output from the second signal processing circuit 22, to the luminance correction processing unit 33 without performing the color space correction processing as described above. If the color filter 21 provided on the CCD 21 of the scope unit 2 is a complementary color filter, the second microcomputer 36 outputs a control signal to the color space correction processing unit 32 so that the color space correction processing unit 32 performs the color space correction processing as described above to obtain the luminance signal Y and chrominance signals R-Y and B-Y and outputs the obtained luminance signal Y and chrominance signals R-Y and B-Y to the luminance correction processing unit 33.

The luminance correction processing unit 33 performs luminance correction processing, based on the content of the optical system information, on the signal output from the color space correction processing unit 32.

Figure 5:
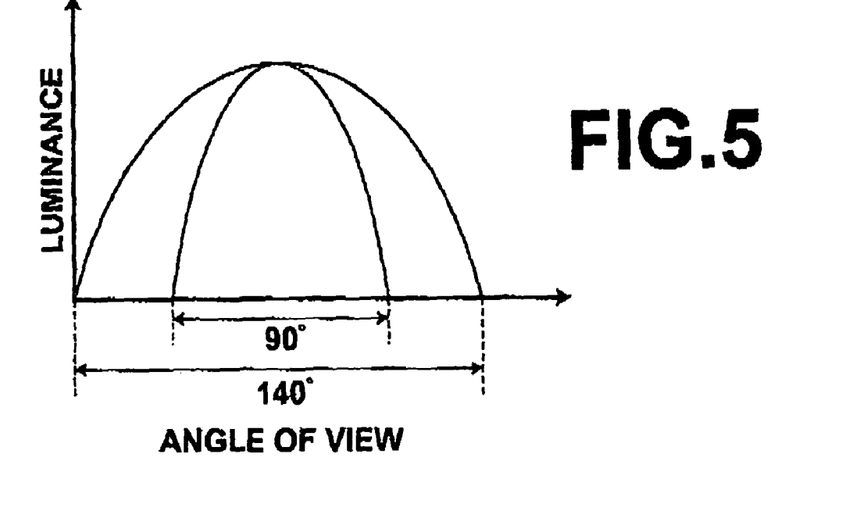
FIG. 5 is a diagram for explaining luminance correction processing in the electronic endoscope apparatus illustrated in FIG. 1.

Here, the distribution of the luminance of the image formed on the CCD 21 in the case that the optical system information (angle of view of the objective optical system 21b) shows 140 degrees and in the case that the optical system information shows 90 degrees is illustrated in FIG. 5, for example. As illustrated in FIG. 5, the peripheral portion of the image is darker when the optical system information shows 140 degrees. The luminance correction processing unit 33 performs luminance correction processing so as to reduce the difference in luminance at the peripheral portion of the image due to a difference in the angle of view among a plurality of kinds of scope units 2, as described above. Specifically, the luminance correction processing unit 33 performs processing so that the luminance represented by the signal corresponding to the peripheral portion of the image formed on the CCD 21 becomes higher as the value of the optical system information is larger. More specifically, a table showing a correspondence between the content of the optical system information and the range and degree of changing the luminance is stored in the second microcomputer 36 in advance. The second microcomputer 36 obtains optical system information based on the scope machine type information. Then, the second microcomputer 36 obtains the range and degree of changing the luminance, which corresponds to the optical system information, by referring to the table. The obtained range and degree of changing the luminance is output to the luminance correction processing unit 33. Then, the luminance correction processing unit 33 performs luminance correction processing based on the obtained information. Any well-known operation method may be adopted as an actual operation method in the luminance correction processing. For example, an operation method using a blurred image may be adopted.

The mask processing unit 34 performs mask processing on the signal obtained by the CCD 21. The mask processing in the present embodiment is processing for converting the signal corresponding to the peripheral portion of the image obtained by the CCD 21 and the signal corresponding to the area on the outside of the peripheral portion of the image into signals representing black. The signal corresponding to the peripheral portion of the image obtained by the CCD 21 is converted into a signal representing black because an image of the lens barrel of the objective optical system or the like instead of an image of living tissue is present at the peripheral portion of the image obtained by the CCD 21. The signal corresponding to the peripheral portion is converted into a signal representing black to cover the image of the lens barrel or the like. The signal corresponding to the area on the outside of the peripheral portion of the image obtained by the CCD 21 is converted into a signal representing black so that the image of the living tissue is displayed more clearly.

Figure 6A:
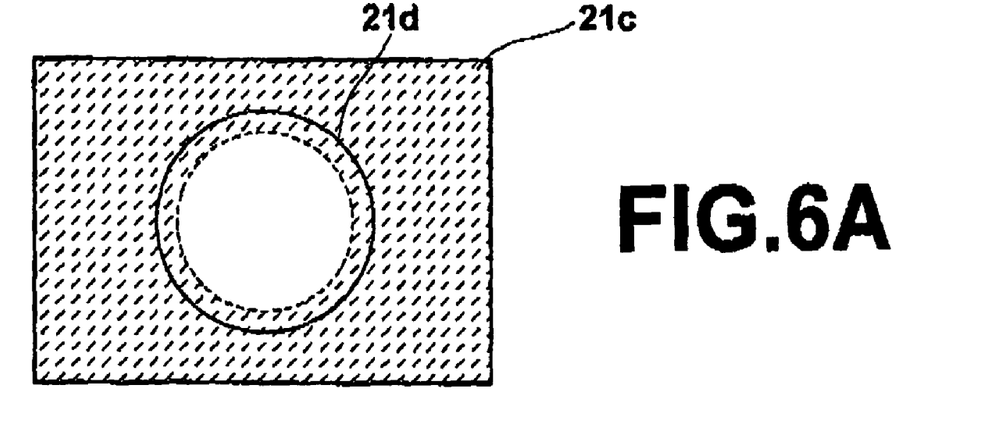
FIG. 6A is a diagram for explaining mask processing in the electronic endoscope apparatus illustrated in FIG. 1.
Figure 6B:
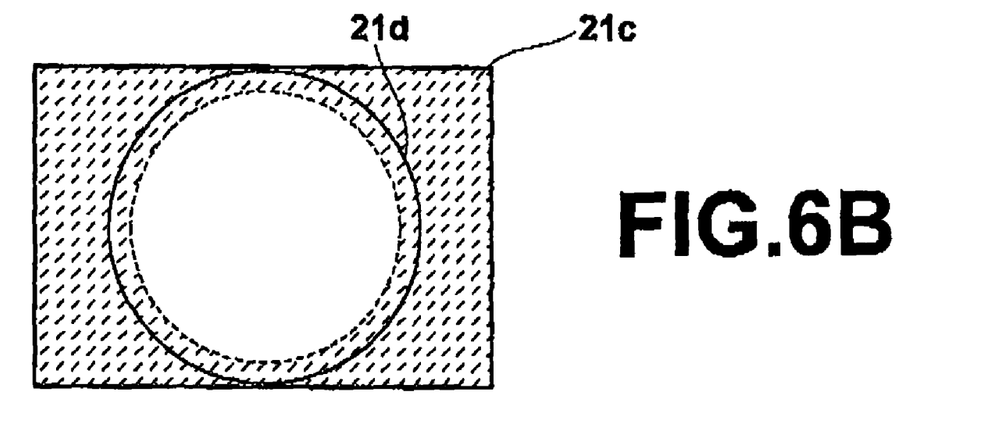
FIG. 6B is a diagram for explaining mask processing in the electronic endoscope apparatus illustrated in FIG. 1.
Figure 6C:
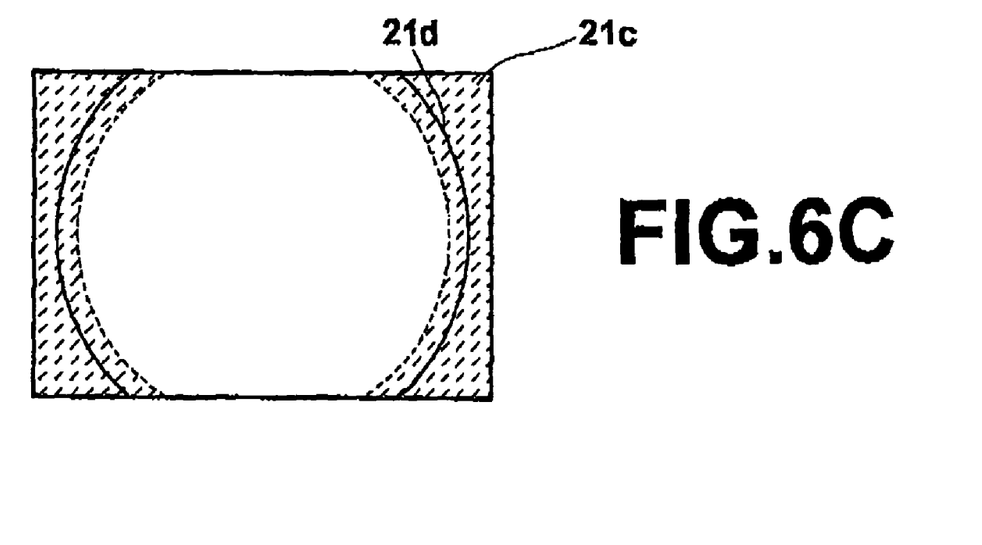
FIG. 6C is a diagram for explaining mask processing in the electronic endoscope apparatus illustrated in FIG. 1.

When the mask processing is performed as described above, it is necessary to obtain information about the range or area on which the mask processing is performed. However, the range is different according to the relationship between the size of the imaging plane of the CCD 21 and that of the image formed on the imaging plane. The mask processing unit 34 performs mask processing while considering the relationship as described above. Specifically, a table showing a correspondence between the content of the mask information and the range on which mask processing is performed is set in the second microcomputer 36 in advance. The second microcomputer 36 obtains mask information based on the scope machine type information, and obtains the range of mask processing corresponding to the mask information by referring to the table. Then, the second microcomputer 36 outputs the information to the mask processing unit 34. The mask processing unit 34 performs mask processing based on the information. FIGS. 6A through 6C illustrate the relationship between the size of the imaging plane 21c of the CCD 21 and that of the image 21d formed on the imaging plane 21c and the range of mask processing, which is determined based on the relationship. In each of FIGS. 6A through 6C, a round area surrounded by a solid line is an area of an image formed on the imaging plane 21c. A shaded area represents a range on which mask processing is performed. As illustrated in FIGS. 6A through 6C, the range on which mask processing is performed becomes larger as the value of the mask information is larger.

Next, the operation of the electronic endoscope apparatus according to the present embodiment will be described.

First, a scope unit 2 is selected from a plurality of kinds of scope units 2 based on the kind of examination or the like. When a connector unit 28 of the selected scope unit 2 is connected to a connector unit 38 of the signal processing unit 3, the first microcomputer 23 of the scope unit 2 reads out the scope machine type information stored in the first memory 24. Then, the first microcomputer 23 outputs the readout scope machine type information to the second microcomputer 36 of the signal processing unit 3. The second microcomputer 36 of the signal processing unit 3 refers to Table 1, illustrated above, and obtains the filter information, optical system information and mask information corresponding to the scope machine type information, input by the first microcomputer 23. Then, the second microcomputer 36 outputs a control signal as described above, based on the obtained filter information, to the second signal processing circuit 31 and the color space correction processing unit 32. The second microcomputer 36 also obtains the range and degree of changing the luminance, which corresponds to the optical system information, based on the obtained optical system information, and outputs the range and degree of changing the luminance to the luminance correction processing unit 33. Further, the second microcomputer 36 obtains the range of performing mask processing based on the obtained mask information, and outputs the range of performing mask processing to the mask processing unit 34.

Meanwhile, after the scope unit 2 is connected to the signal processing unit 3, as described above, the leading edge of the scope unit 2 is inserted into a body cavity. Then, white light emitted from the light source apparatus 4 is guided to the optical filter 26 by the light guide means 25. Then, illumination light in a desired wavelength range is obtained by the optical filter 26 by removing light in the other range from the white light, and the illumination light is emitted from the illumination lens 27 to illuminate the object to be observed 10.

Then, the illumination light is reflected by the object 10 to be observed, and an image is formed on the imaging surface of the CCD 21 by the objective optical system 21b with the reflected light. At this time, the light which is transmitted through the color filter 21a in the CCD 21 is formed on the imaging plane of the CCD 21. Then, photoelectric conversion is performed on the image formed on the imaging plane of the CCD 21, and the signal which is produced by performing photoelectric conversion is output to the first signal processing circuit 22.

Then, processing such as correlated double sampling processing and automatic gain control and A/D conversion processing is performed on the input signal at the first signal processing circuit 22, and a digital image signal is output. The digital image signal output from the first signal processing circuit 22 is input to the second signal processing circuit 31 of the signal processing unit 3 through the connector units 28 and 38.

If the filter information obtained by the second microcomputer 36 shows a primary filter, the luminance signal Y and chrominance signals R-Y and B-Y are calculated in the second signal processing circuit 31, as described above. Then, the luminance signal Y and the chrominance signals R-Y and B-Y are output to the color space correction processing unit 32. The color space correction processing unit 32 outputs the luminance signal Y and the chrominance signals R-Y and B-Y to the luminance correction processing unit 33 without processing.

Meanwhile, if the filter information obtained by the second microcomputer 36 shows a complimentary filter, the signal of R, G and B is calculated at the second signal processing circuit 31, as described above. Then, the signal of R, G and B is output to the color space correction processing unit 32. Then, the color space correction processing unit 32 performs color space correction processing on the signal of R, G and B, as described above. Then, the luminance signal Y and the chrominance signals R-Y and B-Y are calculated based on the signal of R, G and B on which the color space correction processing has been performed. The luminance signal Y and the chrominance signals R-Y and B-Y are output to the luminance correction processing unit 33.

Then, the luminance correction processing unit 33 performs luminance correction processing on the luminance signal Y and the chrominance signals R-Y and B-Y which are input by the color space correction processing unit 32. The luminance correction processing unit 33 performs luminance correction processing based on the range and degree of changing the luminance, which is output from the second microcomputer 36.

Then, the luminance signal Y and the chrominance signals R-Y and B-Y on which the luminance correction processing has been performed is output to the mask processing unit 34. Then, the mask processing unit 34 performs mask processing on the luminance signal Y and chrominance signals R-Y and B-Y based on the range on which mask processing is performed. The range on which mask processing is performed is the range output from the second microcomputer 36.

Then, the luminance signal Y and the chrominance signals R-Y and B-Y on which mask processing has been performed is output to the D/A conversion circuit 35, and converted into analog signals. The analog signals are output to a monitor connected to the signal processing unit 3. Then, a color image is displayed on the monitor based on the analog signal.

In the electronic endoscope according to the embodiment as described above, the scope machine type information is output to the signal processing unit 3 as information which indirectly shows the kind of the color filter 21a of the scope unit 2, the angle of view of the objective optical system 21b and the relationship between the size of the imaging plane of the CCD 21 and that of the image formed on the imaging plane. However, the information is not limited to the information as described above. Information which directly shows the kind of the color filter 21a of the scope unit 2, the angle of view of the objective optical system 21b and the relationship between the size of the imaging plane of the CCD 21 and that of the image formed on the imaging plant may be output from the scope unit 2 to the signal processing unit 3.

In the electronic endoscope apparatus according the present embodiment, information showing the kind of the optical filter 26 of the scope unit 2 may be output to the color space correction processing unit 32, and the color space correction processing unit 32 may perform color space correction processing based on the kind of the optical filter 26. Specifically, if the optical filter 26 is a filter for removing the wavelength range of red, color correction processing should be performed so as to add red color components. If the optical filter 26 is a filter for removing the wavelength range of yellow, color correction processing should be performed so as to add yellow color components. As an actual operation method in the color correction processing, any well-know operation method can be adopted.

What is claimed is:

1. An electronic endoscope apparatus comprising:
   a scope unit including a color filter which transmits light reflected by an object to be observed when the object is illuminated with light, an insertion unit to be inserted into a body cavity, and an imaging element within the insertion unit for obtaining an image of the object to be observed by receiving the reflected light transmitted through the color filter, which outputs a color image signal by obtaining the image of the object to be observed by the imaging element; and
   a signal processing unit for producing a signal for display, which can display an image including predetermined color components by performing signal processing, based on the kind of the color filter, on the color image signal output from the imaging element of the scope unit,
   wherein the scope unit further includes a filter information storage means for storing filter information showing the kind of the color filter provided in the scope unit, and
   wherein the signal processing unit includes a connection unit for selectively connecting a plurality of kinds of scope units, each of which has the filter information showing a different kind of color filter from each other, a filter information obtainment means for obtaining the filter information stored in the filter information storage means of the scope unit connected to the connection unit, and a color space correction processing unit for performing color space correction processing, based on the filter information obtained by the filter information obtainment means, on the color image signal so that each of the signals for display, produced from each of the color image signals which are output from the plurality of kinds of scope units, represents the same point in color space.

2. An electronic endoscope apparatus as defined in claim 1, wherein the color space correction processing unit does not perform the color space correction processing on the color image signal if the kind of the color filter in the filter information is a primary color filter, and wherein the color space correction processing unit performs the color space correction processing on the color image signal if the kind of the color filter in the filter information is a complementary color filter.

3. An electronic endoscope apparatus as defined in claim 1, wherein the scope unit further includes an image formation optical system for forming the image of the object to be observed on the imaging element and an optical system information storage means for storing optical system information showing the kind of the image formation optical system, and wherein the signal processing unit further includes an optical system information obtainment means for obtaining the optical system information stored in the optical system information storage means of the scope unit connected to the connection unit and a luminance correction processing unit for performing luminance correction processing on the color image signal based on the optical system information obtained by the optical system information obtainment means, such that the luminosity of the signals corresponding to the periphery of the formed image becomes higher as the view angle of the optical system represented by the optical system information becomes greater.

4. An electronic endoscope apparatus as defined in claim 3, wherein the optical system information is information about an angle of view.

5. An electronic endoscope apparatus as defined in claim 4, wherein the luminance correction processing unit performs processing so that the luminance of a signal corresponding to the peripheral portion of the image obtained by the imaging element becomes higher as the angle of view is wider.

6. An electronic endoscope apparatus as defined in claim 3, wherein the luminance correction processing is operation processing using a blurred image.

7. An electronic endoscope apparatus as defined in claim 1, wherein the scope unit further includes an image formation optical system for forming the image of the object to be observed on the imaging element and a mask information storage means for storing mask information showing a relationship between the size of an imaging plane of the imaging element provided in the scope unit and that of an image formed on the imaging plane by the image formation optical system, and wherein the signal processing unit further includes a mask information obtainment means for obtaining the mask information stored in the mask information storage means of the scope unit connected to the connection unit and a mask processing unit for performing mask processing on the color image signal based on the mask information obtained by the mask information obtainment means.

8. An electronic endoscope apparatus as defined in claim 7, wherein the mask processing is processing for converting a signal corresponding to the peripheral portion of the image obtained by the imaging element and a signal corresponding to an area on the outside of the peripheral portion to signals representing black.

* * * * *